United States Patent [19]

Namekawa

[11] Patent Number: 4,766,905
[45] Date of Patent: Aug. 30, 1988

[54] ULTRASONIC TRANSMITTER/RECEIVER

[75] Inventor: Kouroku Namekawa, Tokyo, Japan

[73] Assignee: Aloka Co., Ltd., Tokyo, Japan

[21] Appl. No.: 48,969

[22] Filed: May 8, 1987

Related U.S. Application Data

[63] Continuation-in-part of Ser. No. 717,496, Mar. 28, 1985, abandoned.

[30] Foreign Application Priority Data

Apr. 2, 1984 [JP] Japan .............................. 59-063281

[51] Int. Cl.[4] .............................................. A61B 10/00
[52] U.S. Cl. .................................................... 128/663
[58] Field of Search ...................... 128/663; 73/861.25

[56] References Cited

U.S. PATENT DOCUMENTS

| | | | |
|---|---|---|---|
| 3,334,622 | 8/1967 | Brech | 128/660 |
| 4,149,419 | 4/1979 | Connell, Jr. et al. | 128/660 X |
| 4,205,687 | 6/1980 | White et al. | 128/663 |
| 4,583,552 | 4/1986 | Iinuma | 128/663 |
| 4,660,565 | 4/1987 | Shirasaka | 128/663 X |
| 4,675,294 | 6/1987 | Magnin et al. | 128/663 |

Primary Examiner—Francis J. Jaworski
Attorney, Agent, or Firm—Koda and Androlia

[57] ABSTRACT

An ultrasonic transmitter/receiver for moving member measurement wherein an ultrasonic pulse beam is transmitted into and received from a subject under examination at a fixed pulse-repetition frequency, the signal received during each transmission/reception cycle is compared with the signal received during the previous transmission/reception cycle to obtain a comparison signal and the movement of a moving member in the subject is detected and measured on the basis of the comparison signal. The ultrasonic transmitter/receiver is further provided with a scanner for causing an ultrasonic beam to reciprocally scan the subject, a memory for storing comparison signals at addresses corresponding to the scanning positions of the ultrasonic beam, the memory being responsive to address data representing the scanning position of the ultrasonic beam to output the comparison signal stored at the corresponding address one scan earlier and simultaneously store at the same address the comparison signal for the same scanning position of the current scan, and in adder for adding the comparison signal for said position of the current scan and the comparison signal for said position one scan earlier output by the memory, whereby scanning noise contained in the comparison signals is eliminated.

2 Claims, 5 Drawing Sheets

TRANSMITTED & RECEIVED ULTRA-
SONIC BEAMS IN ONE CYCLE EARLIER

TRANSMITTED & RECEIVED ULTRASONIC
BEAMS IN CURRENT CYCLE

COMPARISON SIGNAL 300

TRANSMITTED & RECEIVED ULTRASONIC
BEAMS IN ONE CYCLE EARLIER

TRANSMITTED & RECEIVED ULTRASONIC
BEAMS IN CURRENT CYCLE

COMPARISON SIGNAL 300

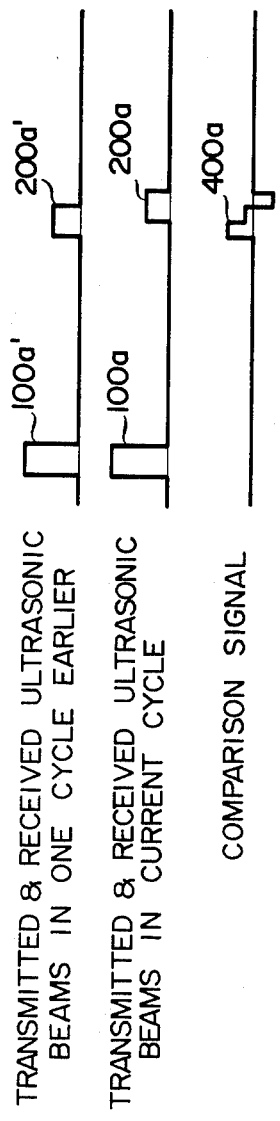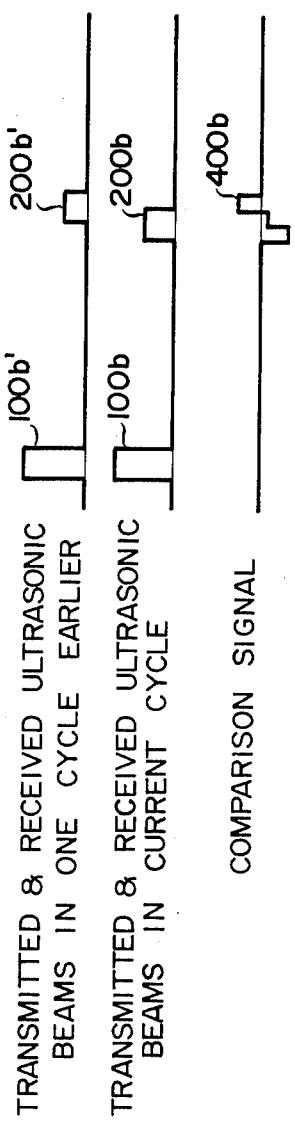

ULTRASONIC TRANSMITTER/RECEIVER

This is a continuation-in-part application of Ser. No. 717,496, filed Mar. 28, 1985, now abandoned.

BACKGROUND OF THE INVENTION

1. Field of the Invention

This invention relates to an ultrasonic transmitter/receiver, more particularly to an improved ultrasonic transmitter/receiver for detecting and measuring the movement of a moving member within a subject under examination utilized in a two dimensional doppler device.

2. Description of the Prior Art

There are known ultrasonic transmitter/receivers which detect and measure the velocity of a moving member within a subject under examination by transmitting an ultrasonic beam into the subject and then receiving the same beam after reflection by the moving member. These transmitter/receivers are widely used for noninvasively measuring the velocity of movement of a body organ such as the heart, of blood flowing in blood vessels or of other body fluids.

The operating principle of such an ultrasonic transmitter/receiver is schematically illustrated in FIG. 1. A probe 10 is used to transmit an ultrasonic beam 100 into a subject 12 as pulses of a given fixed pulse-repetition frequency and to receive the pulses after they are reflected from some member 14 within the subject. Then, using the moving target indication (MTI) method, correlated comparison method, phase comparison method or some other known method, signal processing is carried out in each cycle to compare the signal resulting from the transmission and reception of the ultrasonic pulse in the current cycle with that obtained in the preceding cycle.

With this arrangement, when there is no moving member within the subject 12, the signal 200 (FIG. 2) obtained by transmitting and receiving the ultrasonic beam 100 during the current cycle and the signal 200' obtained by transmitting and receiving the ultrasonic beam 100' in the preceding cycle are of precisely the same amplitude and phase. As a result, no output signal is obtained by subjecting these two signals to comparative processing. In other words, the level of the comparison signal 300 is zero.

On the other hand, when a moving member exists within the subject, the signal 200 obtained by transmitting and receiving the beam 100 in the current cycle and the signal obtained by transmitting and receiving the beam 100' in the preceding cycle differ in both amplitude and phase, as shown in FIG. 3. Therefore, when these signals are subjected to comparative processing, there is obtained a comparison signal 300 corresponding to the amount of movement by the moving member 14.

With this ultrasonic transmitter/receiver then it is possible to detect and measure the velocity of the moving member 14 within the subject on the basis of the comparison signal 300 obtained by comparing the signal obtained by transmitting and receiving the beam 100 in the current cycle with that obtained by transmitting and receiving the beam 100' in the preceding cycle.

The conventional ultrasonic transmitter/receiver has, however, been able to carry out accurate detection and measurement with respect to the moving member 14 only when the ultrasonic beam 100 is transmitted into and received from the subject 12 in one fixed direction.

When the ultrasonic beam 100 is made to scan the subject 12 by changing its direction at a predetermined velocity, the signal 200 will change in phase and amplitude even when there is no moving member present within the subject 12. As a result, scanning noise will arise in the comparison signal 300.

This will be clear from an analysis of the acoustic model in FIG. 4, which shows a stationary body 16 being scanned by the ultrasonic beam 100 in the direction indicated by the arrow. In this case, as shown in FIG. 5, the signal 200 obtained by transmitting/receiving the ultrasonic beam 100 in the current cycle and the signal 200' obtained by transmitting/receiving the ultrasonic beam 100' in the preceding cycle differ from each other in both phase and amplitude. As a consequence, the comparison signal 300 obtained by comparative processing of the signals 200 and 200' contains a scanning noise component 400.

From this it will be understood that with the conventional device, when the ultrasonic beam 100 is made to scan by changing its direction at a given velocity, scanning noise arises in the comparison signal 300, making it impossible to detect and measure the velocity of movement of a moving member within the subject 12 with high accuracy.

Because of this problem, one technique used in conventional devices is to set the scanning angle $\theta$ between adjacent ultrasonic beam pulses 100, 100' transmitted into the subject 12 at a very small value so as to minimize the scanning noise component 400. Use of this method, however, tends to result in excessively fine scanning which makes it impossible to scan the ultrasonic beam 100 at high speed.

Another practice resorted to is to repeat the transmission/reception of the ultrasonic beam 100 a number of times in one fixed direction in order to obtain a like number of signals 200 from which there can be derived a comparison signal 300 free from scanning noise, and then to repeat this operation at successive scanning positions so as to carry out scanning in a stepwise manner. One problem with this method is that it can be applied only to electronic-scanning type ultrasonic transmitter/receivers which carry out quantized scanning and cannot be applied to mechanical-scanning type ultrasonic transmitter/receivers which carry out continuous scanning. Another is that devices using this method are unable to scan the ultrasonic beam 100 at high speed.

SUMMARY OF THE INVENTION

In view of the above-mentioned disadvantages inherent in conventional ultrasonic transmitter/receivers, it is the object of the present invention to provide a two dimensional doppler device with an ultrasonic transmitter/receiver which effectively eliminates scanning noise from the comparison signal regardless of the scanning velocity of the ultrasonic beam, whereby it is possible to carry out accurate detection and measurement with respect to a moving member within the subject under examination.

In order to attain this object, the present invention provides an ultrasonic transmitter/receiver for moving member measurement wherein an ultrasonic pulse beam is transmitted into and received from a subject under examination at a fixed pulse-repetition frequency, the signal received during each transmission/reception cycle is compared with the signal received during the previous transmission/reception cycle to obtain a comparison signal and the movement of a moving member in the subject is detected and measured on the basis of the comparison signal. The ultrasonic transmitter further includes scanning, means for causing an ultrasonic beam to reciprocally scan the subject, memory means for storing comparison signals at addresses corresponding to the scanning positions of the ultrasonic beam, said memory means being responsive to address data representing the scanning position of said ultrasonic beam to output the comparison signal stored at the corresponding address one scan earlier and simultaneously store at the same address the comparison signal for the same scanning position of the current scan, and adder means for adding the comparison signal for said position of the current scan and the comparison signal for said position one scan earlier output by said memory means, whereby scanning noise contained in the comparison signals is eliminated.

Being arranged in this manner, the transmitter/receiver according to the present invention is capable of eliminating scanning noise from the comparison signals regardless of the scanning velocity of the ultrasonic beam, making it possible to carry out highly accurate detection and measurement of the moving member in the subject under examination even when the scanning with the ultrasonic beam is conducted at high speed.

BRIEF DESCRIPTION OF THE DRAWING

FIGS. 8 and 9 are explanatory views showing the waveforms of signals obtained by conducting the reciprocal scanning illustrated in FIG. 7.

DESCRIPTION OF THE PREFERRED EMBODIMENT

Figure 6:
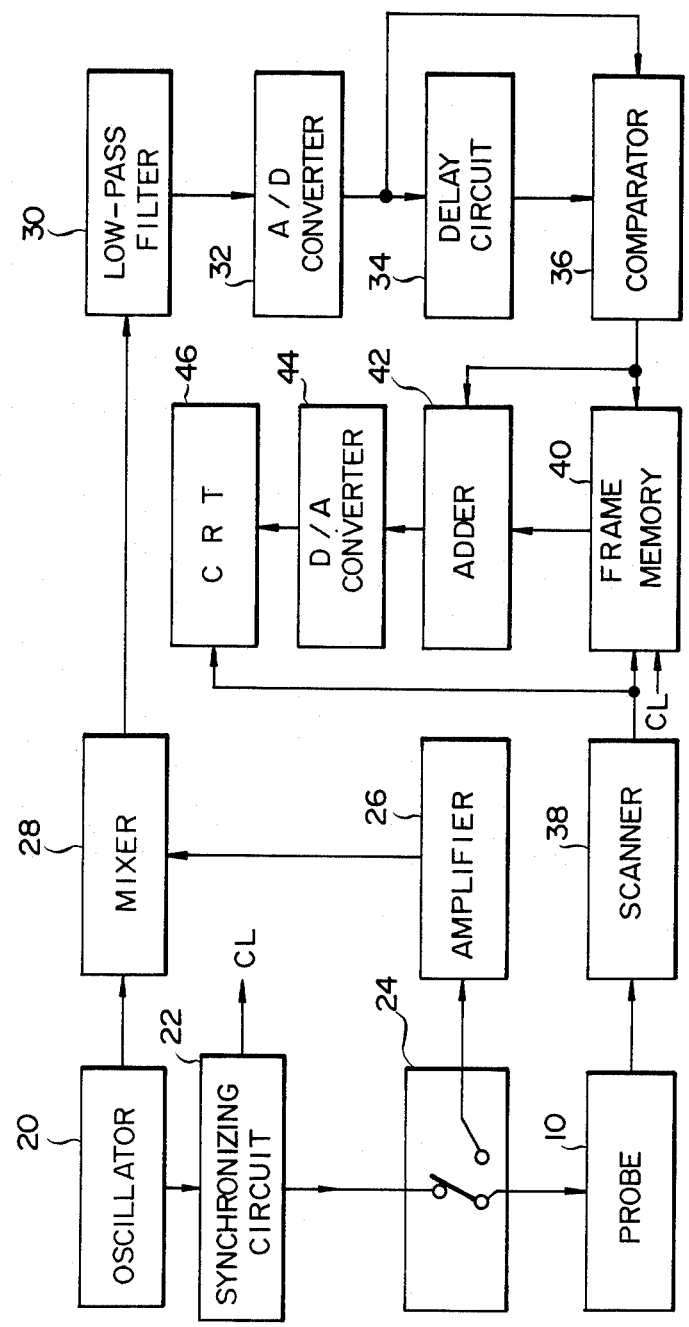
FIG. 6 is a block diagram of the electrical circuit of one embodiment of the ultrasonic transmitter/receiver according to the present invention.

FIG. 6 shows one embodiment of the ultrasonic transmitter/receiver utilized in the two dimensional doppler device of the present invention. In this embodiment, a continuous high-frequency (3 MHz) signal produced by an oscillator 20 is supplied to a synchronizing circuit 22 which outputs a burst pulse train with a repetition frequency of 4 kHz and a 2 MHz clock pulse CL for driving a digital circuit.

The burst pulses from the synchronizing circuit 22 are applied to a probe 10 through a switching circuit 24, causing the probe 10 to transmit/receive an ultrasonic beam 100 into/from a subject under examination 12 at a prescribed pulse-repetition frequency in synchronization with the burst pulses supplied thereto.

The reflected ultrasonic wave received by the probe 10 is converted into an electric signal by the probe 10 and input to an amplifier 26 via the switching circuit 24.

The electric signal is amplified by the amplifier 26 and sent to a mixer 28 where it is mixed with the continuous high-frequency signal from the oscillator 20. The mixed signals are sent to a low-pass filter 30.

The low-pass filter 30 passes only the component of the received signal of a frequency not exceeding 1 MHz and this component is forwarded to an analog/digital (A/D) converter 32 to be converted into a digital signal.

The received signal now converted into digital form is sent on to a delay circuit 34 and to a comparator 36. The received signal sent to the delay circuit 34 is sent to the comparator 36 after being delayed by a period equal to one repetition cycle of the ultrasonic beam 100.

Furthermore, the dimensions of the information contained in the digital signal which is supplied to the delay circuit 34 and the comparator 36 are "$A\sin\theta$" or "$A\cos\theta$" wherein the voltage A is the amplitude and $\theta$ is the phase containing doppler signal. The dimensions of the output of the comparator 36 are in degrees or radians and the argument of the information contained in the digital signal is detected in the comparator 36. In particular, the output comparator 36 is the angle $\phi$ and its dimensions are in degrees or radians. This angle is extracted in the form of a digital signal from the comparator 36 and converted to an analog voltage in the D/A converter 44 so as to be displayed on the CRT 46. Theoretically, the angle $\phi$ can be expressed by the following equation:

$$\phi = 2\pi \cdot f0 \cdot T \cdot 2V/C \cos\phi 0$$

In the above equation f0 equals the ultrasonic frequency (i.e. 3 MHz); T equals the pulse repetition period (i.e. 250 $\mu$s); C equals the acoustic velocity (i.e. 1500 m/sec); $\phi 0$ equals the angle of the beam direction against the moving member (i.e. 60°); and V equals the flow velocity (i.e. 0.25 m/sec). Therefore, utilizing the example values, the angle $\phi$ equals 45°. In addition, the data operated upon by the comparator 36 and delay circuit 34 is a complex signal having both real time data and pseudo real time data and the argument of the complex signal is proportional to the velocity of the moving member 14. Also, the amount of time delay in the delay circuit 34 is equivalent to the time required for one cycle of the pulse repetition frequency (PRF) and on the assumption that the PRF is 4 Khz, the time for one cycle becomes 250 $\mu$s.

As a consequence, the comparator 36 simultaneously receives the received signal output by the A/D converter 32 for the current cycle and the received signal output by the delay circuit which, having been delayed by one cycle, is that for one cycle earlier.

The comparator 36 is arranged to subject the two signals input thereto by MTI, correlated comparison, phase comparison or other type of known comparative signal processing to determine velocity of the moving member.

Figure 1:
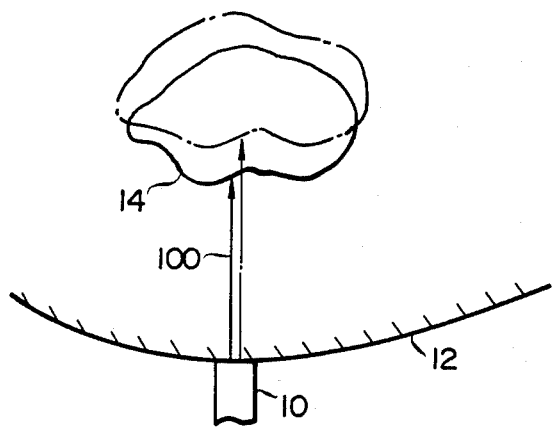
FIG. 1 is an explanatory view illustrating the operation of a conventional ultrasonic transmitter/receiver.
Figure 4:
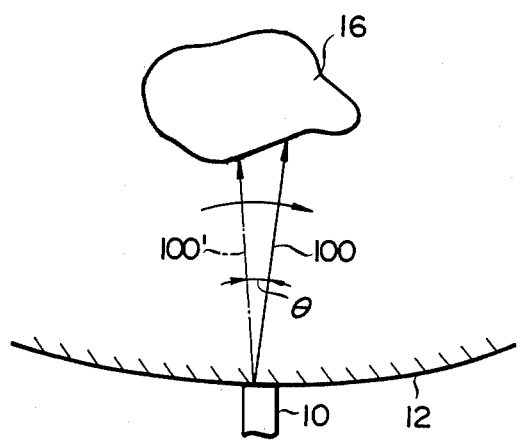
FIG. 4 is an explanatory view illustrating the operation of a conventional ultrasonic transmitter/receiver.
Figure 2:
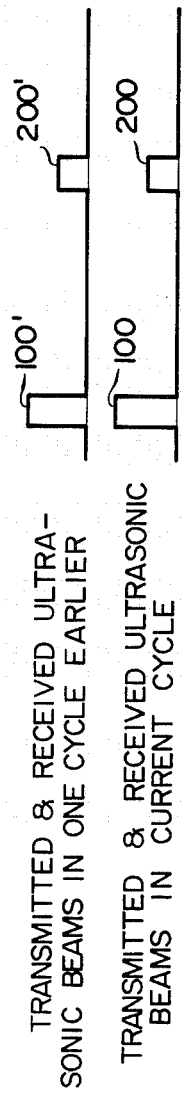
FIGS. 2 and 3 are explanatory views showing the waveforms of signals obtained using the transmitter/receiver shown in FIG. 1.
Figure 3:
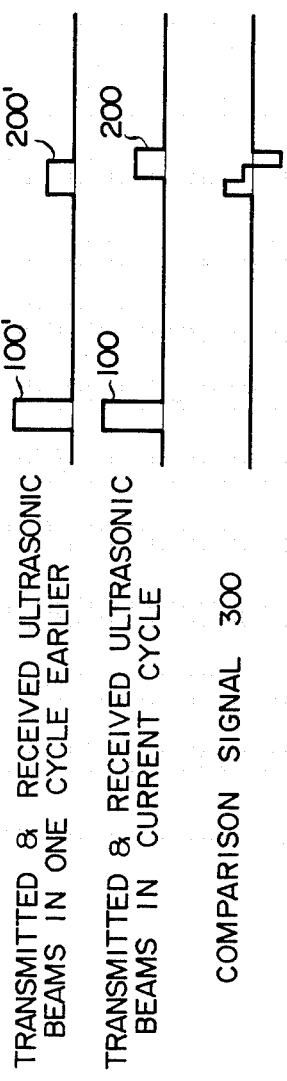
Figure 5:
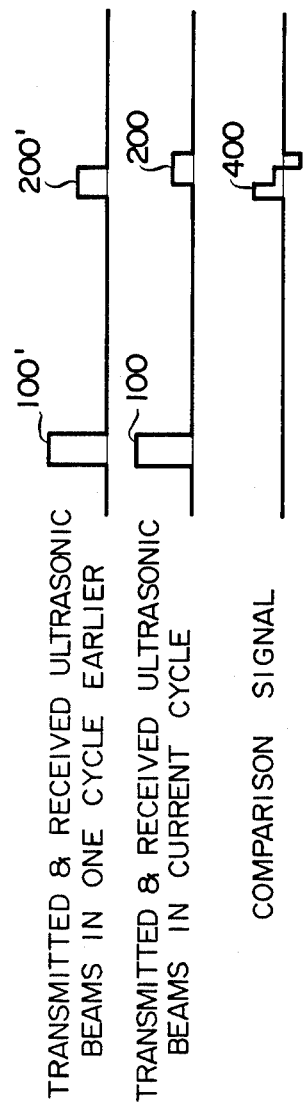
FIG. 5 is an explanatory view showing the waveforms of signals obtained using the transmitter/receiver shown in FIG. 4.

As a result, when no moving member exists within the subject 12, the comparator 36 outputs a comparison signal 300 of zero level, as was explained earlier in connection with FIG. 2. On the other hand, when a moving member 14 is present within the subject 12, the comparator 36 outputs a comparison signal 300 of a level proportional to the amount of movement of the moving member 14, as was explained earlier in connection with FIG. 3.

What characterizes the present invention is that the transmitter/receiver is arranged to eliminate the scanning noise that arises in the comparison signal output by the comparator 36 in the case where the ultrasonic beam 100 scans the subject 12, thus enabling accurate detection and measurement of the moving member 14 within the subject 12.

For this, the transmitter/receiver is provided with a scanning means for reciprocally scanning the moving member 14 with the ultrasonic beam 100. In the present embodiment, this reciprocal scanning with the ultrasonic beam 100 is achieved by using an electronic scanning type probe for the probe 10 and providing a scanner 38 for causing the electronic scanning type probe 10 to carry out reciprocal scanning with the ultrasonic beam 100.

With this arrangement, when the ultrasonic beam 100 reciprocally scans the subject 12, the scanning noise components 400 contained in the comparison signals 300 output by the comparator 36 during the "go" and "return" halves of each reciprocal scanning sweep are of precisely the same magnitude but of opposite polarity.

Figure 7:
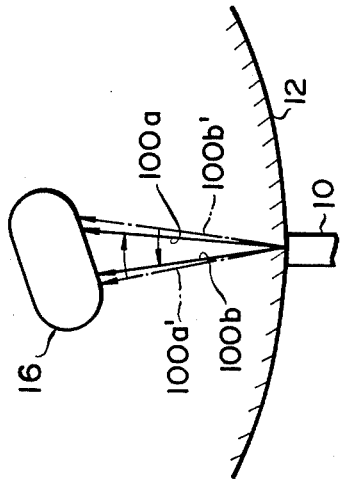
FIG. 7 is an explanatory view showing the case where reciprocal scanning of an ultrasonic beam is conducted using the transmitter/receiver illustrated in FIG. 6.

This will be better understood from an analysis of the acoustic model shown in FIG. 7. Here presume that the ultrasonic beam reciprocally scans a given region of a stationary member 16 within the subject 12. In this case, when the beam moves in the "go" direction, i.e. from beam position 100a' on the left to beam position 100a on the right, there are obtained the signals shown in FIG. 8, while when the beam moves in the "return" direction, i.e. from beam position 100b' on the right to beam position 100b on the left, there are obtained the signals shown in FIG. 9. As is clear from the FIGS. 8 and 9, the comparison signals 300a and 300b obtained by scanning of the ultrasonic beam 100 in the "go" and "return" directions, respectively, contain scanning noise components 400a, 400b, which are identical in magnitude and phase but opposite in polarity.

From this it is obvious that by adding using an adder 42 the comparison signal 300a obtained by scanning a given region of the subject 12 in the "go" direction and the comparison signal 300b obtained by scanning the same region in the "return" direction, it is possible to eliminate the scanning noise component 400 completely from the comparison signal 300, whereby it becomes possible to accurately detect and measure the movement of any moving member 14 within the subject 12.

For this, the transmitter/receiver according to this invention comprises frame memory 40 for storing comparison signals at addresses corresponding to the scanning positions of the ultrasonic beam, said memory means being responsive to address data representing the scanning position of said ultrasonic beam to output the comparison signal stored at the corresponding address one scan earlier and simultaneously store at the same address the comparison signal produced by the comparator 36 for same scanning position of the current scan, and an adder 42 for adding the comparison signal from the comparator 36 for said position of the current scan and the comparison signal for said position one scan earlier output by said memory means, whereby scanning noise contained in the comparison signals is eliminated. Furthermore, the calculation in the comparator 36 is performed by reading out the results of the calculation which has been previously memorized in the frame memory 40. As a result, the time required for the calculation process is approximately equal to the time of one cycle of the pulse repetition frequency and two times the time required for one cycle of the pulse repetition frequency is needed for completed the calculation in one line.

In the present embodiment, the which frame memory 40 which has scanning addresses corresponding to the scanning positions of the ultrasonic beam 100 and the frame memory is not a scan converter and is provided independently from any scan converter. Furthermore, the frame of the frame memory 40 is one complete two dimensional image plane formed by the scanning process. Two scans of the field scanning process makes one complete frame and the frame memory 40 independently memorizes the two dimensional data of the one image plane. The scanning addresses of the memory 40 are designated is distance address signals represented by an address direction signal output by the scanner 38 and the clock pulse CL output by the synchronizing circuit 22. Upon receipt of such an address signal, the frame memory 40 reads out the data currently written at the scanning address concerned and immediately thereafter writes at the same address the comparison signal 300 output by the comparator 36 at that time.

The adder 42 adds together the data read from the frame memory 40 and the comparison signal 300 output by the compartor 36. The result of the addition output from the adder 42 is sent to a D/A converter 44 and from there on to a cathode ray tube (CRT) 46.

The operation of the present embodiment having the structure described above will now be explained.

When reciprocal scanning with the utrasonic beam is started using the transmitter/receiver according to the present embodiment, the comparison signals 300a output from the comparator 36 during the initial "go" scan are successively written at the scanning addresses of the frame memory in order from younger to older address numbers.

When the first "go" scan has been completed, the ensuing "return" scan begins. During the "return" scan the data already stored in the frame memory 40, i.e. the comparison signals 300a for the preceding "go" scan, are read out from the scan addresses in reverse order, i.e. starting with the oldest address number and proceeding toward the youngest. At the same time, the new comparison signals 300b being output by the comparator 36 are written at the scan addresses from which the earlier data have been read out, in this way renewing the data stored in the frame memory 40.

In this way, during each succeeding scan in the "go" ("return") direction, the data stored in the preceding scan in the "return" ("go") direction are read out, while those for the current scan are written in.

Where the ultrasonic beam 100 is transmitted/received in the same direction, the scanning noise component 400a contained in the comparison signal 300a for the "go" scan and the scanning noise component 400b contained in the comparison signal 300b for the "return" scan will, as shown in FIGS. 8 and 9, be identical in amplitude and phase but opposite in polarity.

Therefore, if the comparison signal 300a for the "go" scan output by the comparator 36 and the comparison signal 300b for the "return" scan output by the frame memory 40 are added together in the adder 42 as is the case in the present invention, it becomes possible to eliminate the scanning noise components 400 contained in the comparison signals 300. As a result, by forwarding the signals output by the comparator 36 to the CRT 46 it is possible to obtain an image on the CRT 46 which accurately represents the distribution of the moving member 14 within the subject 12, and if necessary it is also possible to accurately calculate the velocity of the movement of the moving member 14. In particular, the image displayed on the CRT 46 is not merely an incremental signal of the echo and represents velocity information which has been signal processed and the image is formed by modulating brilliantly the angle which is proportional to the velocity in response to the amount of voltage and the velocity is detected at predetermined points of the beam shaft.

Since with the transmitter/receiver according to the present invention the scanning noise contained in the comparison signals can be eliminated merely by adding the comparison signals obtained by the "go" scan and the "return" scan, it becomes possible to eliminate the scanning noise and accurately detect and measure the movement of the moving member 14 in the subject 12 even when the scanning with the ultrasonic beam is conducted at high speed.

Also, the present invention enables the same high-speed scanning with the ultrasonic beam in quantized scanning of the beam as is attainable in continuous scanning thereof.

It should further be noted that this invention is applicable not only to sector scanning type ultrasonic transmitter/receivers but also to ultrasonic transmitter/receivers of the linear scanning type.

Moreover, the present invention is not limited to application to the electronic scanning type ultrasonic transmitter/receiver of the foregoing embodiment but can also be applied to ultrasonic transmitter/receivers employing mechanical scanning.

In the embodiment described above, the memory means was constituted of a single frame memory 40. However, the present invention is not limited to this arrangement but may be arranged using two or more separate frame memories and data can be written into and read from these frame memories in turn.

As will be clear from the above explanation, the present invention makes it possible to effectively eliminate scanning noise from the comparison signals regardless of the scanning speed used for the ultrasonic beam and, as a result, enables accurate detection and measurement of a moving member within a subject under examination.

I claim:

1. An ultrasonic transmitter/receiver for detection and measurement of a moving member comprising:
    a means for transmitting and receiving an ultrasonic pulse beam into and from a subject under examination at a fixed pulse-repetition frequency and for outputting signal corresponding to received ultrasonic pulses;
    scanning means for causing the ultrasonic pulse beam to reciprocally scan the subject in a go-direction and return-direction and for generating address data representing scanning positions of the ultrasonic beam;
    a means for comparing each of the signals received during each reciprocal scan in the go-direction and return-direction with each of the signals received during a previous reciprocal scan in the go-direction and return-direction, respectively, to obtain comparison signals;
    memory means for storing comparison signals and addresses corresponding to the scanning position of the ultrasonic beam, said memory means be responsive to address data from the scanning means representing the scanning position of said ultrasonic beam to output the comparison signal stored at the corresponding address of the previous reciprocal scan and simultaneously store at the same address the comparison signal for the same scanning position of a current reciprocal scan; and
    adder means for adding the comparison signal for said position of the current reciprocal scan and the comparison signal for said position of the previous reciprocal scan outputted from said memory means, whereby scanning noise contained in the comparison signals is eliminated.

2. An ultrasonic transmitter/receiver according to claim 1 wherein said memory means comprises at least one frame memory having scanning addresses corresponding to the scanning positions of said ultrasonic beam.

* * * * *